United States Patent [19]

Matsuno et al.

[11] Patent Number: 5,623,653
[45] Date of Patent: Apr. 22, 1997

[54] DOCUMENT CONTROL, ROUTING, AND PROCESSING APPARATUS

[75] Inventors: Toshihiro Matsuno, Kawasaki; Hiromi Sakushima, Fujisawa; Hayashi Ito, Tokyo, all of Japan

[73] Assignee: Matsushita Electric Industrial Co., Ltd., Japan

[21] Appl. No.: 283,681

[22] Filed: Jul. 25, 1994

[30] Foreign Application Priority Data

Jul. 27, 1993 [JP] Japan .................................. 5-184795

[51] Int. Cl.$^6$ .................................................. G06F 17/30
[52] U.S. Cl. ........................... 395/609; 395/616; 395/201
[58] Field of Search .................................. 395/600, 700; 364/419.19, 401

[56] References Cited

U.S. PATENT DOCUMENTS

| | | | |
|---|---|---|---|
| 4,503,499 | 3/1985 | Mason et al. | 395/650 |
| 4,633,430 | 12/1986 | Cooper | 395/144 |
| 5,181,162 | 1/1993 | Smith et al. | 364/419.19 |
| 5,200,993 | 4/1993 | Wheeler et al. | 379/96 |
| 5,319,543 | 6/1994 | Wilhelm | 364/401 |

FOREIGN PATENT DOCUMENTS

| | | |
|---|---|---|
| 0447341 | 9/1991 | European Pat. Off. . |
| 4-220747 | 8/1992 | Japan . |

OTHER PUBLICATIONS

Wilson et al., "Structured Planning: Deriving Project Views", *Software Engineering Journal*, vol. 5, No. 2, Mar. 1990, pp. 138–148.

Dayao et al., "SuperForms: A Security–enhanced Smart Electronic Form Management System", *Globecom '90: IEEE Global Telecommunications Conference and Exhibition. 'Communications Connecting the Future'*, San diego, Calif, 2–5 Dec., 1990, pp. 1079–Anonymous, Workflow: Control is Key. (Controlling workflow in Groupware: design and Operational Requirements, Methods and Strategies, RELease 1.0, vol. 92, No. 9, Sep. 30, 1992, pp. 10–12.

Robert Mills, "Going With the Flow. (Workflow Management Systems For Engineering Organizations) (Special Report: Managing Engineering Data)", Computer–Aided Engineering, vol. 13, No. 2, Feb., 1994, pp. psR12–psR17.

Compton et al., "Intelligent Validation and Routing of Electronic Forms in a Distributed Workflow Environment", *Proceedings of the Tenth Conference on Artificial Intelligence for Applications*, San Antonio, Texas, 1–4 Mar. 1994, pp. 125–131.

Hans Schuster et al., "A Client/Server Architecture for Distributed Workflow Management Systems", University of Erlangen, 21 Mar. 1994, pp. 1–18.

*Primary Examiner*—Thomas G. Black
*Assistant Examiner*—Paul R. Lintz
*Attorney, Agent, or Firm*—Rossi & Associates

[57] ABSTRACT

A document processing apparatus comprises: a storing portion for storing document data; an instruction generation portion for generating a first set of instructions and second sets of instructions with regard to the document data in response to a first user, each of the second sets of instructions assigned to each of second users; and an automatic processing control portion for sequentially changing a parson who can access to the document data from one of second users to another of the second users and for controlling of execution of the second sets of instructions for the parson. The first set of instructions and second sets of instructions are transmitted together with the document data through a mail box system. A user having or treating the document data is supervised by providing a management table. When the document is transmitted to another user, the name of the user is stored in the management table.

3 Claims, 14 Drawing Sheets

| DOCUMENT NAME | USER | PROC INSTRUCTIONS | COMPL FLG | |
|---|---|---|---|---|
| DN | USER A | exec "EDIT"<br>exec "CONFIRM"<br>send to "USER B" | 1 | 202 |
| | USER B | exec "EDIT"<br>exec "BACKUP"<br>send to "USER C" | 0 | 203 |
| | USER C | exec "REGISTER"<br>if NAME="REQUESTING DECISION"<br>then<br>send to "USER D"<br>else<br>exec "EDIT"<br>send to "USER E"<br>endif | 0 | 204 |
| | USER D | exec "EDIT"<br>exec "STORE" | 0 | 205 |
| | USER E | exec "STORE" | 0 | 206 |

| DOCUMENT NAME | USER | PROC INSTRUCTIONS | COMPL FLG | |
|---|---|---|---|---|
| DN | USER A | exec "EDIT"<br>exec "CONFIRM"<br>send to "USER B" | 1 | 202 |
| | USER B | exec "EDIT"<br>exec "BACKUP"<br>send to "USER C" | 0 | 203 |
| | USER C | exec "REGISTER"<br>if NAME="REQUESTING DECISION"<br>then<br>  send to "USER D"<br>else<br>  exec "EDIT"<br>  send to "USER E"<br>endif | 0 | 204 |
| | USER D | exec "EDIT<br>exec "STORE" | 0 | 205 |
| | USER E | exec "STORE" | 0 | 206 |

| DOCUMENT ID NO. | NAME OF USER HAVING THE DOCUMENT | COMPLETION FLG |
|---|---|---|
| 0001001 | yamada | 1 |
| 0000293 | tanaka | |
| 0007457 | saito | |
| 0000636 | sato | |
| 0000128 | goto | |
| 0000238 | ogawa | |
| 0000293 | miyamoto | |

| DOCUMENT NAME & DOCUMENT ID NO. | MANAGEMENT USER | OTHER USER NAME | PROC INSTRUCTIONS | COMPL FLG |
|---|---|---|---|---|
| DN 0001001 | USER R | USER X | exec "EDIT" <br> exec "BACKUP" | 1 |
| | | USER Y | exec "EDIT" <br> exec "STORE IN DB" | 0 |

| NAME OF USER HAVING THE DOCUMENT | DATA PROC APP |
|---|---|
| yamada | 1a |
| tanaka | 1b |

DOCUMENT CONTROL, ROUTING, AND PROCESSING APPARATUS

BACKGROUND OF THE INVENTION

1. Field of the Invention

This invention relates to a document processing apparatus for executing processings of a document in accordance with an inputted procedure.

2. Description of the Prior Art

A method for controlling document distribution in a data processing system is known. Such a method is disclosed in U.S. Ser. No. 07/494,059 filed Mar. 15, 1990 and now abandoned. This prior art method for controlling document distribution in a data processing system creates a distribution profile object which is associated with each document for which control of distribution is desired. Within each distribution profile object are listed the addresses for which a document is intended in the order in which those specified addresses will receive the document. The distribution profile object also includes a specified action with regard to the document in question which shall be accomplished upon the completion of the specified distribution sequence.

However, in such a prior art method for controlling of the document distribution, the specified action is only executed after completion of the specified distribution sequence, the execution of the specified action requires authorization of the originator of the distribution, and it is impossible to execute a combination of actions or an action under a specified condition.

SUMMARY OF THE INVENTION

The present invention has been developed in order to remove the above-described drawbacks inherent to the conventional document processing apparatus.

According to the present invention there is provided a first document processing apparatus comprising: a storing portion for storing document data; an instruction generation portion for generating a first set of instructions and second sets of instructions with regard to the document data in response to a first user, each of the second sets of instructions assigned to each of second users; and an automatic processing control portion for sequentially changing a person who can access to the document data from one of second users to another of the second users and for controlling of execution of the second sets of instructions for the person.

The first set of instructions and second sets of instructions are transmitted together with the document data through a mail box system. More specifically, according to the present invention there is also provided a second document processing apparatus as mentioned in the first document processing apparatus, wherein the automatic processing control portion comprises: an automatic executing portion for executing one of the second sets of instructions; a data transmission portion, including the mail box system, for transmitting the first set of instructions, the second sets of instructions, and the document data in the storing portion to another of the second users in accordance with the first set of instructions; a data arrival detection portion for detecting an arrival of the transmitted first set of instructions, the second sets of instructions, and the document data from the data transmission portion and for informing an operator of the arrival; and an execution user control portion for detecting whether or not the operator agrees with the another of the second users using the first set of instructions and for operating the automatic executing portion to execute one of the second sets of instructions for another of the second user.

A user having or treating the document data is supervised by further providing a management table. When the document is transmitted to another user, the name of the user is stored in the management table. That is, according to the present invention there is further provided a third document processing apparatus as mentioned in the second document processing apparatus, wherein the execution user control portion detects an execution condition of the first set of instructions and the second sets of instructions and transmits data of the execution condition using the transmission portion and the document processing apparatus, further comprising an execution condition supervising portion, having a storing portion, for receiving the data of the execution condition, for storing the data in the storing portion, and for informing the data stored in the storing portion in response to an operation.

BRIEF DESCRIPTION OF THE DRAWINGS

The object and features of the present invention will become more readily apparent from the following detailed description taken in conjunction with the accompanying drawings in which:

FIG. 4 is an illustration of the first embodiment for showing the set of instructions shown in FIG. 3 in a form of a program list;

FIG. 8 is an illustration of the second embodiment showing an example of contents of the management table shown in FIG. 7;

FIG. 9 is an illustration of the second embodiment showing an example of the document processing instruction when a user starts to treat the document;

FIG. 15 is an illustration of the first embodiment for showing a table for determining which one of document processing apparatus shown in FIG. 1 is assigned to the user.

The same or corresponding elements or parts are designated as like references throughout the drawings.

DETAILED DESCRIPTION OF THE INVENTION

Hereinbelow will be described a first embodiment of this invention.

Figure 1:
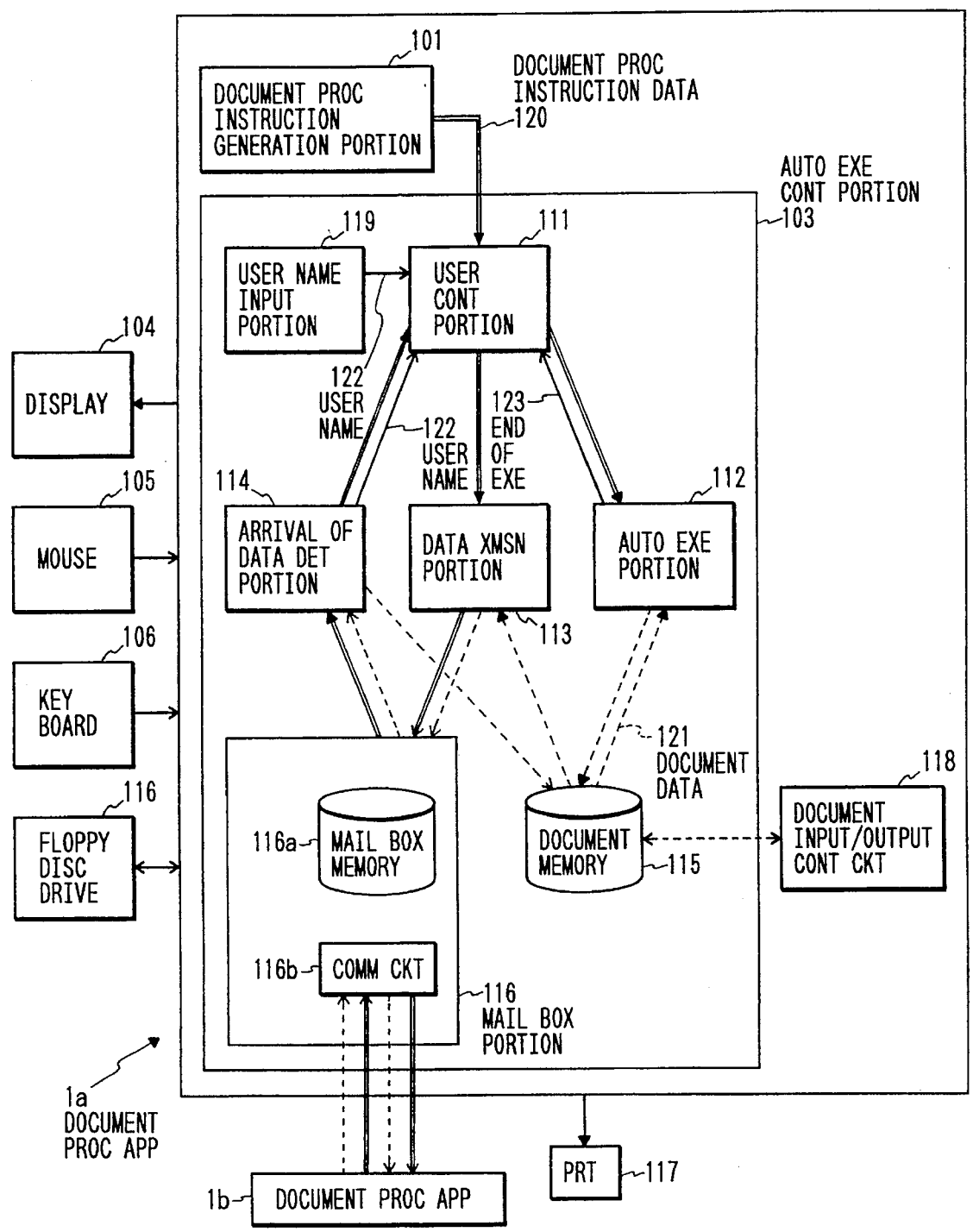
FIG. 1 is a block diagram of the first for showing a document processing apparatus of this invention.

FIG. 1 is a block diagram of the first for showing a document processing apparatus of this invention. The document processing apparatus 1a has a display 104, a mouse 105, a keyboard 106, a floppy disc drive 116, a document input/output control circuit 118, a printer 117, and a document memory 115. A user can input a document into a memory 115 of the document processing apparatus 1a using the mouse 105 and keyboard 106 with watching information on the display 104. A document may be inputted into the memory 115 of the document processing apparatus through the document input/output control circuit 118 from the floppy disc drive 116. A document can be seen on the display 104 or can be seen as a printed copy by the document input/output control circuit 118 and the printer 117. The document processing apparatus 1a further comprises a document processing instruction generation portion 101 for generating one or more document processing instructions, i.e., document processing instruction data 120 in corporation with the display 104, the mouse 105, and keyboard 106 using an input program with a graphical display, an automatic execution control portion 103 for automatically executing processing of a document stored in the document memory 115 thereof in accordance with the document processing instruction data 120 wherein a flow of the document processing instruction data 120 is denoted by an arrow with a double line in this drawing. The document processing instructions inputted can be seen on the display 104 or can be seen as a printed copy by the document input/output control circuit 118 and the printer 117.

The automatic execution control portion 103 comprises: a user control portion 111 for receiving and storing the document processing instruction data 120 from the document processing instruction generation portion 101, for controlling of distribution of a document, for controlling of automatic execution of the document processing, and for receiving document processing instruction data 120 from other user using this document processing apparatus 1a or from other document processing apparatus 1b and a name of user; a data transmission portion 113 for transmitting a document stored in the document memory 115 in accordance with the document processing instruction data 120; a mail box portion 116, having a mail box memory 116a and a communication circuit 116b, for transmitting and receiving the document data and the document processing instruction accompanied with the document to other data processing apparatus 1b through the communication circuit 116b and for storing the document data and the document processing instruction accompanied with the document for other user of this document processing apparatus 1a; an arrival data detection portion 114 for detecting an arrival of a document data and a document processing instruction accompanied with the document, for sending the document data to the document memory 115 and the document processing instruction to the user control portion 111, and for detecting a name of user 122 who sent the document data and the document processing instruction, which is supplied to the user control portion 111; a name of user input portion 119 for requesting inputting of a user who will treat a document in question and a document identification number which are supplied to the user control portion 111, and an automatic execution portion 112 for automatically executing one or more processings of a document stored in the document memory 115 in accordance with the document processing instruction data 120 from the user control portion 111.

Figure 2:
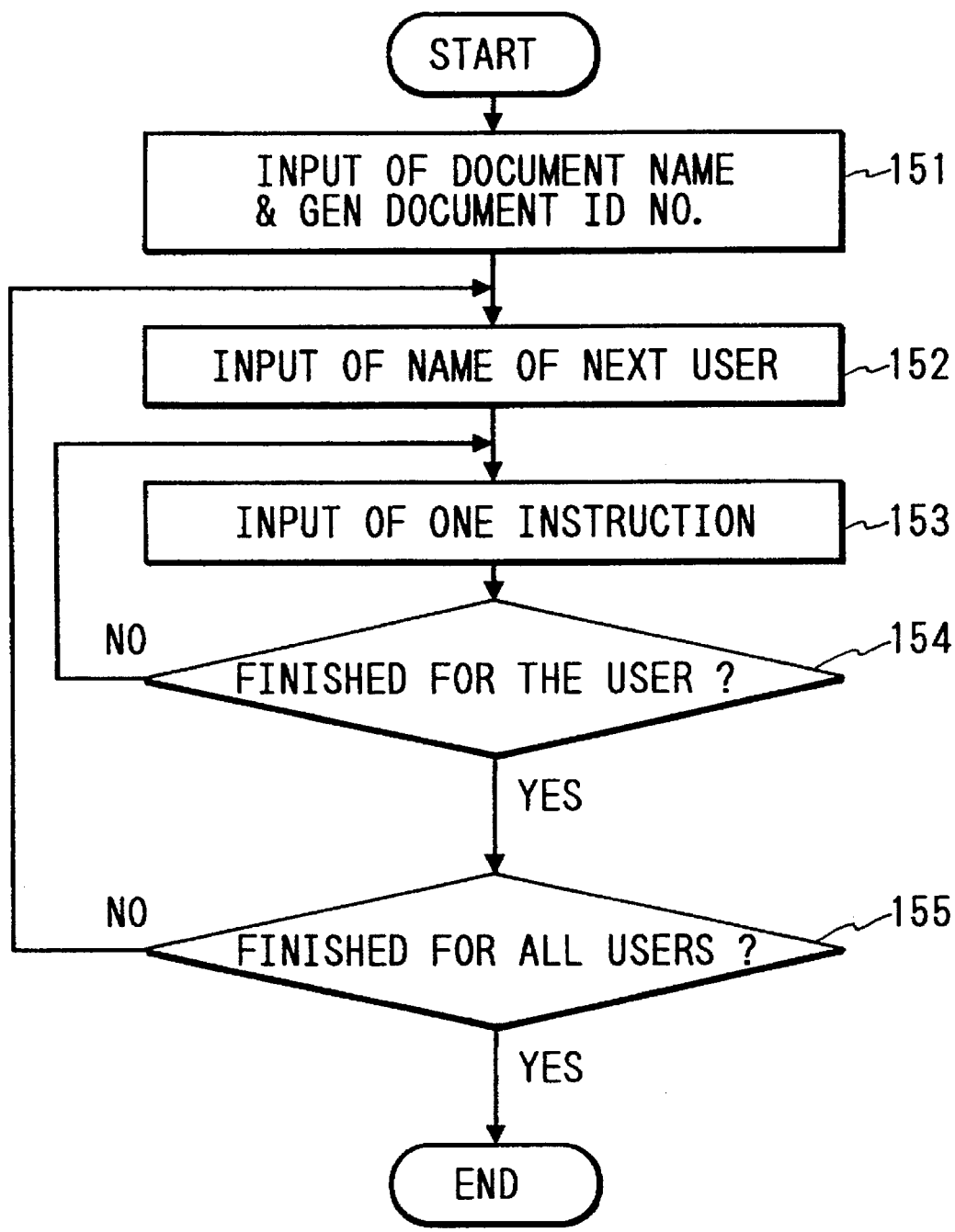
FIG. 2 shows a flow chart of the first embodiment for showing registering operation of the document processing instructions.

An operation of the first embodiment will be described. FIG. 2 shows a flow chart of the first embodiment for showing registering operation of the document processing instructions. The document processing portion 101 registers or generates document processing instruction according to the flow chart shown in FIG. 2 in corporation with an user using the display 104, the mouse 105, and the keyboard 106. The document processing instruction generation portion 101 requests inputting of a name of document to be treated and generates a unique document identification number of the document in step 151. In the following step 152, the document processing instruction generation portion 101 requests inputting of a name of user who is allowed to treat the document. In the following step 153, the document processing instruction generation portion 101 requests inputting of an instruction for processing of the document which is automatically executed by the automatic execution portion 112. In the following step 154, a decision is made as to whether all instructions have been inputted for the user. If NO, processing returns to step 153 until all instructions have been inputted for the user. If YES, processing proceeds to step 155 where the document processing instruction generation portion 101 makes a decision of whether or not all users' instructions have been inputted. If NO, processing returns to step 152 where a name of the next user is requested. If all users' instructions have been inputted in step 155, processing ends.

Figure 3:
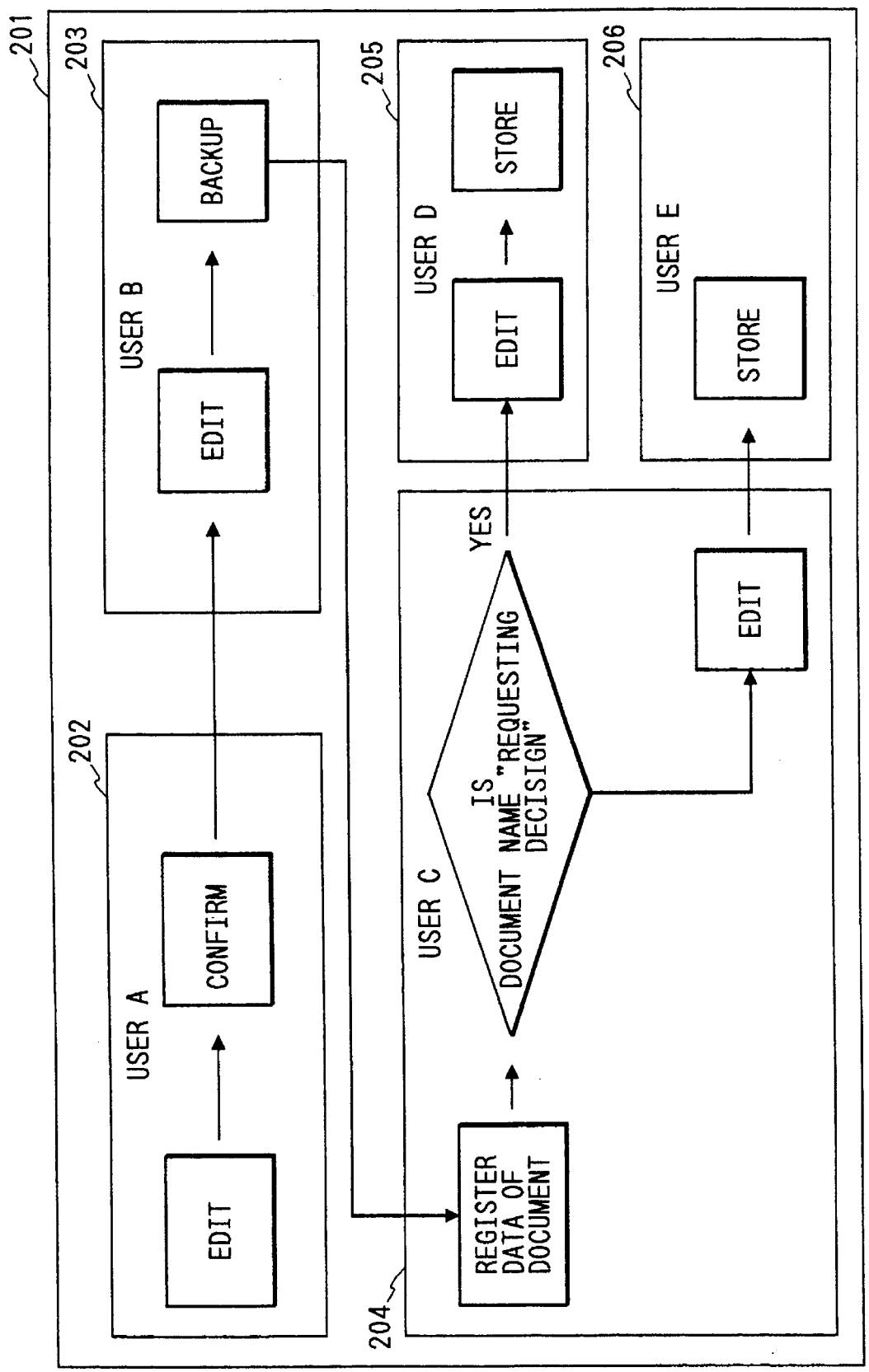
FIG. 3 is an illustration of the first embodiment for showing an example image representing a set of the document processing instructions schematically displayed on the display shown in FIG. 1, which is applicable to a second embodiment.

FIG. 3 is an illustration of the first embodiment for showing an example image representing a set of the document processing instructions schematically displayed on the display shown in FIG. 1. A set 201 of instructions includes stages 202 to 206. In a first stage 202, a user A is allowed to treat the document and is required to edit the document and to confirm the content of the document, that is, a confirmation response is required. In the second stage 203, a user B is allowed to treat the document and is required to edit the document and to make a backup copy of the document. In the third stage 204, a user C is allowed to treat the document and is required to register data of the document or data in the document using a registering program (not shown) and then, a decision is made as to whether or not the name of document is "requesting a decision" by the automatic execution portion 112. If YES, in the following stage 205, a user D is allowed to treat the document and is required to edit the document and to store the document in document memory as a data base. If NO, in the following stage 206, a user E is allowed to treat the document and is required to store the document in document memory as a data base. These instructions are selected from predetermined graphic marks, indicative of respective instructions, arranged on the display 104 using the mouse 105 in accordance with the processing shown in FIG. 2.

FIG. 4 is an illustration of the first embodiment for showing the set of instructions shown in FIG. 3 in a form like a program list. The document processing instruction data 120 includes a document name DN, N user names, N sets of processing instructions, and completion flags wherein N is a natural number and each of N user names corresponds to each of N sets of processing instructions. In a first stage 202, the user A is allowed to treat the document and is required to edit the document and to confirm the content of the document. Therefore, instructions in the first stage 202 include:

execute "EDIT" in the first step;

execute "CONFIRM" in the second step; and send "USER B" in the third step in the first stage 202. That is, one set of instructions includes one or more instructions for document processing and instruction of sending to the next user if there is the next user. In the stages 205 and 206, there is no next user, so that there is no sending instruction.

In this embodiment, the document processing instructions are inputted through the image as shown in FIG. 2 and the document processing instruction generation portion 101 generates the document processing instruction data as shown in FIG. 4. However, a user can input the document processing instruction data as shown in FIG. 4 from the keyboard 106 directly.

Figure 5:
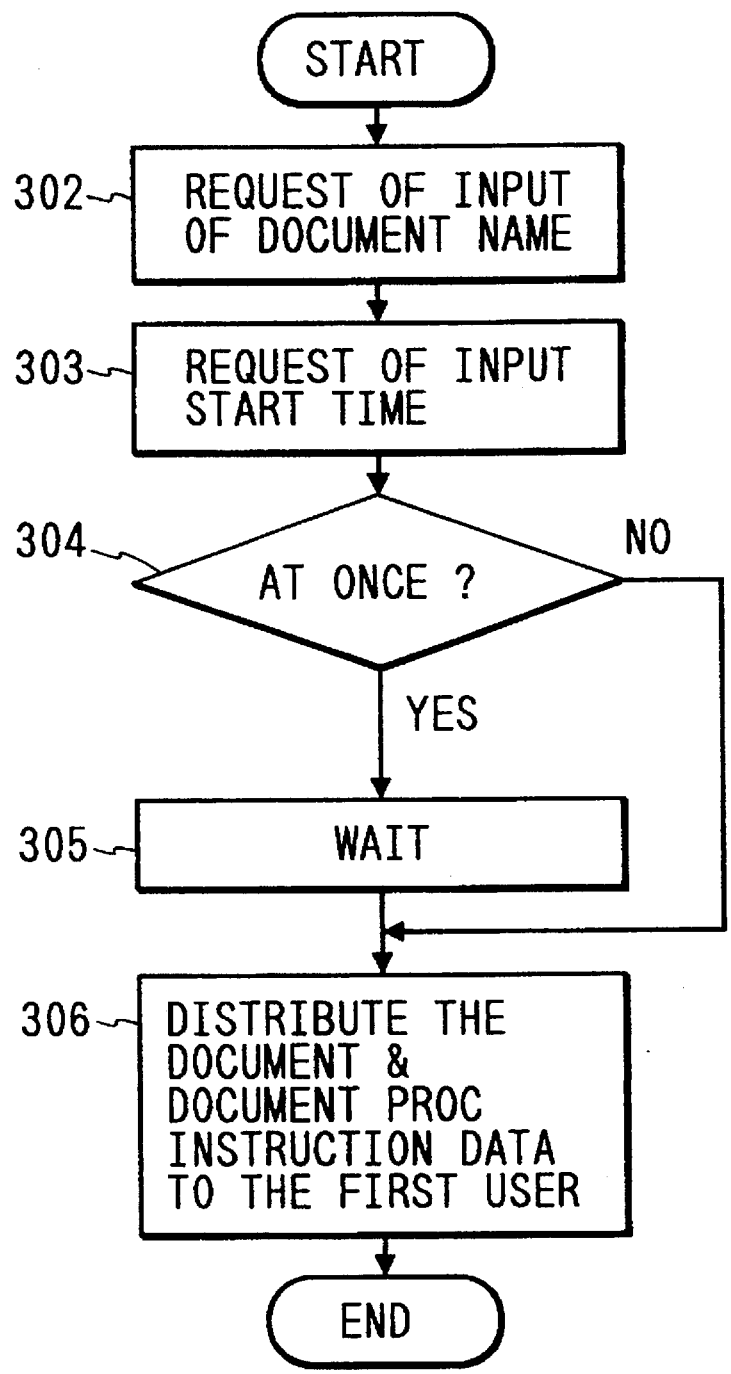
FIG. 5 shows a flow chart of the first embodiment showing a start program of the document processing which is also used in the second embodiment.

FIG. 5 shows a flow chart of the first embodiment showing a start program of the document processing. After the processing shown in FIG. 4, the user control portion 111 starts the processing in accordance with the document processing instruction data by executing processing shown in FIG. 5. In the first step 302, the user control portion 111 requests inputting of document name. In the second step 303, the user control portion 111 requests inputting of start of time of distributing the document and the document processing instruction data. If the distribution should be started at once processing proceeds to step 306. If the start time is not now, the user control portion 111 waits the distribution until the inputted start time. If it becomes the start time, processing proceeds to the step 306. The user control portion 111 distributes the document and the document processing instruction data 120 to a first user in step 306 by the data transmission portion 113 to the mail box portion 116. The mail box portion 116 has two group of addresses. One group of addresses is for users who use this document processing apparatus 1a and the second group of addresses is for users who use another document processing apparatus 1b. If there is only the document processing apparatus 1a, the second group of addresses are not provided. If there are more than one document processing apparatus, first and second groups of address are provided. In this case, the user control portion 111 or the data transmission portion 113 determines which one of document processing apparatus 1a or 1b is assigned to the user. FIG. 15 is an illustration of the first embodiment for showing a table for determining which one of document processing apparatus 1a or 1b is assigned to the user who is allowed to treat the document. Therefore, the user control portion 111 or the data transmission portion 113 can determine which one of document processing apparatus 1a or 1b is assigned to the user. This table may be provided in the user control portion or the data transmission portion 113. Alternatively, this table is attached to the document processing instruction data 120. If the first user uses this data processing apparatus 1a, the data transmission portion 113 reads the document from the document memory 115 and sends the document and the document processing instruction data 120 in accordance with the document name to the mail box portion 116 at the first group of address. The arrival data detection portion 114 periodically detects arrival of document and the document processing data 120. If there is an arrival of document and the document processing data 120, the arrival data detection portion 114 sends the document data to the document memory 115 and the document processing instruction data 120 to the user control portion 111.

If the first user uses another processing apparatus 1b, the data transmission portion 113 reads the document from the document memory 115 and sends the document and the document processing instruction data 120 in accordance with the document name and user's name to the mail box portion 116 at the second group of address. The arrival data detection portion 114 of the data processing apparatus 1b periodically detects arrival of document and the document processing data 120 to the mail box portion 116 of the processing apparatus 1b. If there is an arrival of document and the document processing data 120, the arrival data detection portion 114 of the data apparatus 1b sends the document data to the document memory 115 and the document processing instruction data to the user control portion 111 of the data processing apparatus 1b.

Figure 6:
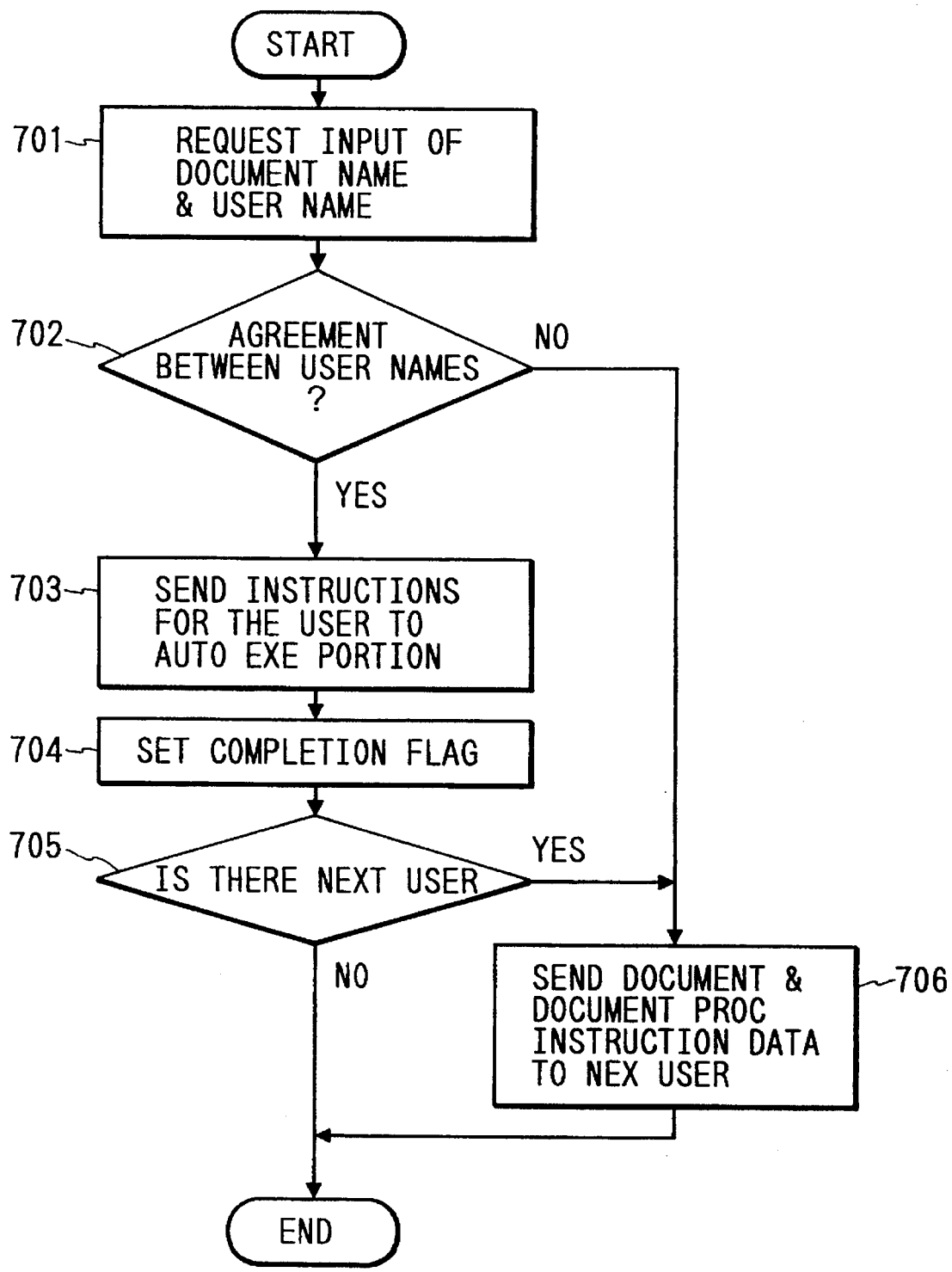
FIG. 6 shows a flow chart of the first embodiment showing processing by the user control portion shown in FIG. 1.

FIG. 6 shows a flow chart of the first embodiment showing processing by the user control portion 111. In the first step 701, the user control portion 111 requests inputting of a desired document name and a name of the user. In step 702, the user control portion 111 makes a decision of whether or not the inputted name of the user agrees with the name of the user authorized to process the document at this time. More specifically, the user control portion 111 sets a completion flag at end of execution of processings for each user as shown in FIG. 4. The user control portion 111 checks the completion flags sequentially in the order of users shown in FIG. 4 and the first (top) user to which a completion flag is not set is compared with the user name inputted in step 701. If NO, that is, the inputted name of the user does not agree with the name of the user authorized to process the document, processing proceeds to step 706. If YES, processing proceeds to step 703. In step 703, the user control portion 111 extracts instructions to be executed by the automatic execution portion 112 from the set of instructions for the user. That is, for example, in the stage of 202, the user control portion 111 extracts the first and second steps of instructions "EDIT" and "CONFIRM" and sends these instructions to the automatic execution portion 112. The automatic execution portion 112 executes the instructions "EDIT" and "CONFIRM". Programs of "EDIT" and "CONFIRM" are included in the automatic execution portion 112. However, a detailed descriptions are omitted because these programs are only example and well known. After executions of "EDIT" and "CONFIRM", the automatic execution portion 112 sends an end of execution signal 123 to the user control portion 111. In response to the end of execution signal 123, the user control portion 111 sets the completion flag for the user A as shown in FIG. 4 in step 704. In the following step 705, the user control portion 111 makes a decision as to whether or not there is a next user by checking data of users and the completion flags or the remaining instructions in the document processing instruction data 120. If NO, processing ends. If YES in the step 705, processing proceeds to step 706. In step 706, the user control portion 111 executes the third step of the instruction, that is, the user control portion 111 sends the document data in question and the document processing instruction accompanied with the document data to the next user B by the data transmission portion 113 and the mail box portion 116.

The data processing apparatus 1a or 1b executes the processing shown in FIG. 6 every arrival of the document data 121 and document processing instruction data 120.

If all instructions for all users listed in the document processing instruction data 120 have been executed, processing of the document ends.

As mentioned above, in the first embodiment, the document processing instruction generation portion 101 provides the document processing instructions having information for successively distributing the document to plurality of users and information for automatically executing the document processing instructions for the distributed user.

Figure 7:
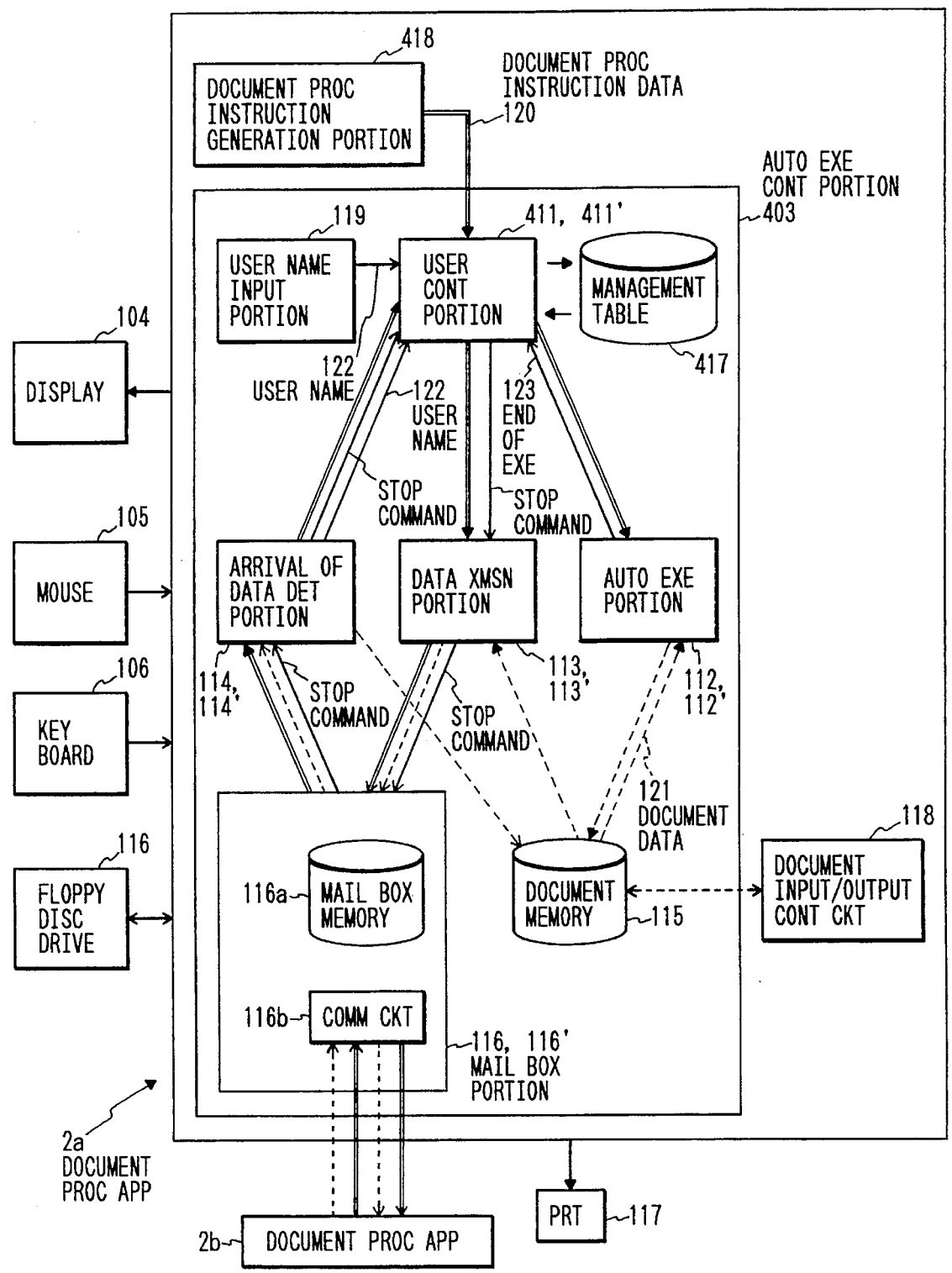
FIG. 7 is a block diagram of the second embodiment showing a data processing apparatus.

FIG. 7 is a block diagram of a second embodiment showing a data processing apparatus.

Figure 10:
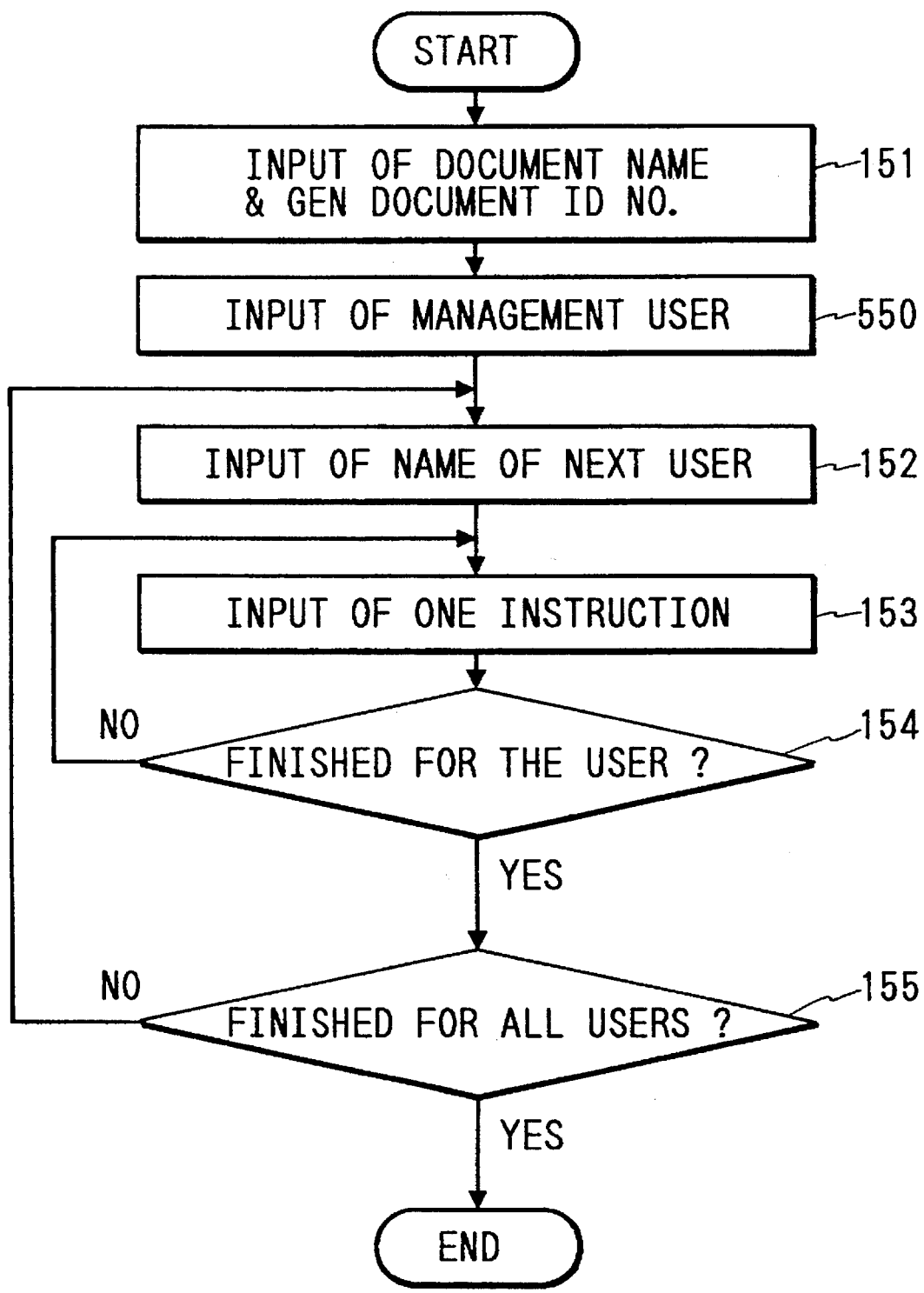
FIG. 10 shows a flow chart of the second embodiment for showing an instruction input operation.

The basic structure of the second embodiment is the same as that of the first embodiment. The difference is in that a management table 417 is added and the document processing instruction generation portion and the user control portion are modified. FIG. 8 is an illustration of the second embodiment showing an example of contents of the management table 417 shown in FIG. 7. The management table 417 includes at least a set of a document identification number 501 and a name 502 of a user having the document. The user control portion 411 stores or renews information of a name 502 of a user having or treating the document and the document processing instruction and supplies the information of a name 502 to the management table 417. FIG. 9 is an illustration of the second embodiment showing an example of the document processing instruction when a user starts to treat the document. The document processing instruction includes a document name 601 and a document identification number 601, a management user R 602, other user names 603, processing instructions 604, and completion flags 605. FIG. 10 shows a flow chart of the second embodiment for showing an instruction input operation. This flow chart shown in FIG. 10 is substantially the same as the flow chart of the first embodiment shown in FIG. 2. The difference is in that a step 550 is added between the steps 151 and 152. In the step 550, a document processing instruction generation portion 418 requires inputting of a management user R to generate the document processing instruction as shown in FIG. 9. Other processings are executed as similar to the flow chart shown in FIG. 2. Therefore, a detailed description is omitted.

When a user or a management user commends a start of the processing of a document to the user control portion 411, the user control portion 411 starts to execute the processing shown in FIG. 5 which is the same as the first embodiment, so that a detailed description is omitted.

Figure 11:
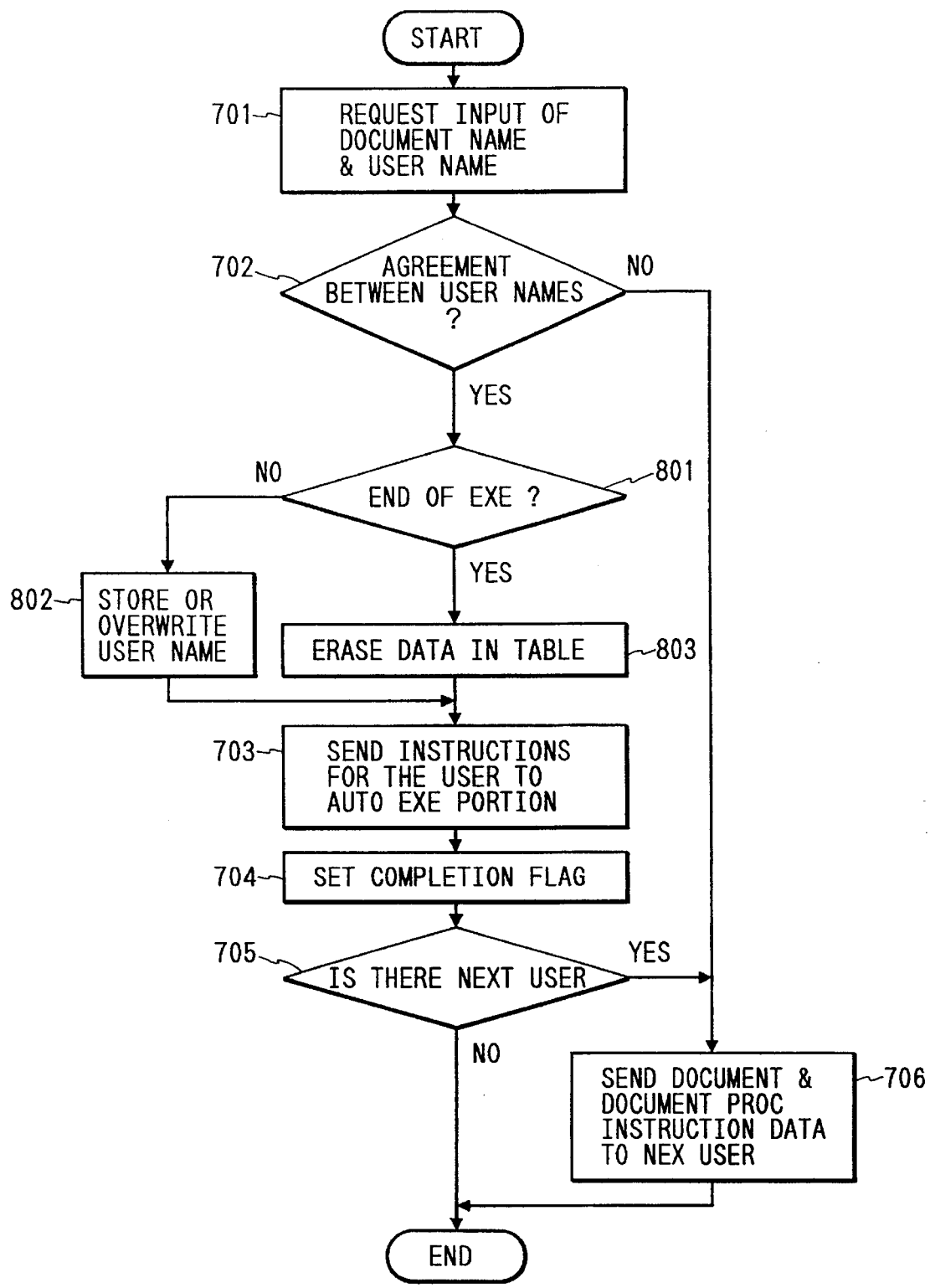
FIG. 11 shows a flow chart of the second embodiment showing processing of the user control portion 411 shown in FIG. 7.

FIG. 11 shows a flow chart of the second embodiment showing processing of the user control portion 411 shown in FIG. 7. A portion of the flow chart shown in FIG. 11 is similar to the flow chart shown in FIG. 6 of the first embodiment. The difference is in that steps 801 to 803 are added between steps 702 and 703 shown in FIG. 6. In step 702, if the answer is YES, that is, if the user name stored in the document processing instruction 418 agrees with the user name inputted in the step 701, a decision is made as to whether or not all instructions for all user have been done in step 801. If NO, in the first processing of step 802, the user control portion 411 stores the name 502 of user having the document in the management table 417 as shown in FIG. 8. If this processing of step 802 is not the first time, the name of user having the document is overwritten in the management table 417. That is, as shown in FIG. 8. A document having a document identification number 0001001 is being treated or had by Yamada, one of user, a name of user having the document "yamada" is stored in the management table 417. If the user having the document changed, other user name is written over the name "yamada".

In step 801, if NO, that is, all instruction for all users stored in the document processing instruction of the document in question have been finished, the user control portion 411 erases the data concerning to the document in the management table 417. Alternatively, a document processing completion flag 503 may be set to the document in the management table 417.

Figure 12:
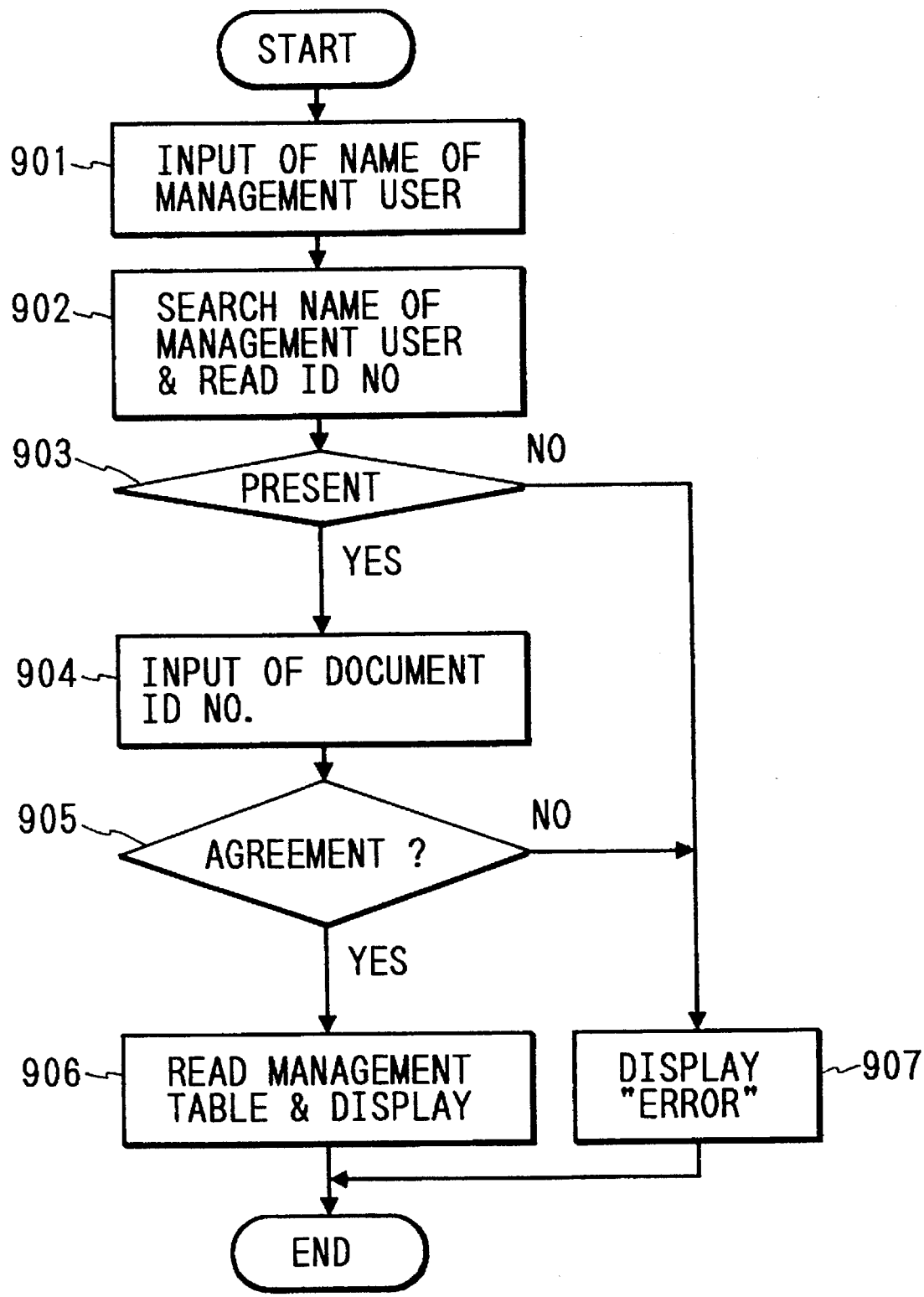
FIG. 12 shows a flow chart of the second embodiment showing a reference operation of the management table shown in FIG. 7.

FIG. 12 shows a flow chart of the second embodiment showing a reference operation of the management table 417 shown in FIG. 7. When a user inputs a display command into the user control portion 411 by the keyboard 106 the mouse 105, this processing starts. In the first step 901, a user is required to input the name of the user. The user control portion 411 searches the name of the user as a management user in step 902 and reads the document identification number corresponding to the searched management user. In the following step 903, a decision is made as to whether or not the inputted name is present in the management table. If NO, processing proceeds to step 907. If YES, the user control portion 411 requires inputting of the document identification number in step 904. In the following step 905, a decision is made as to whether or not the inputted document identification number agrees with the searched document identification number. If YES, the user control portion 411 reads the name of user 502 having the document in the management table 417 and display it by the display 104 in step 906 and the processing ends. In step 905, if the answer is NO, processing proceeds to step 907. In step 907, the user control portion 111 operates the display to indicate "ERROR" and the processing ends. Accordingly, the management user can be informed who is having the document.

Figure 13:
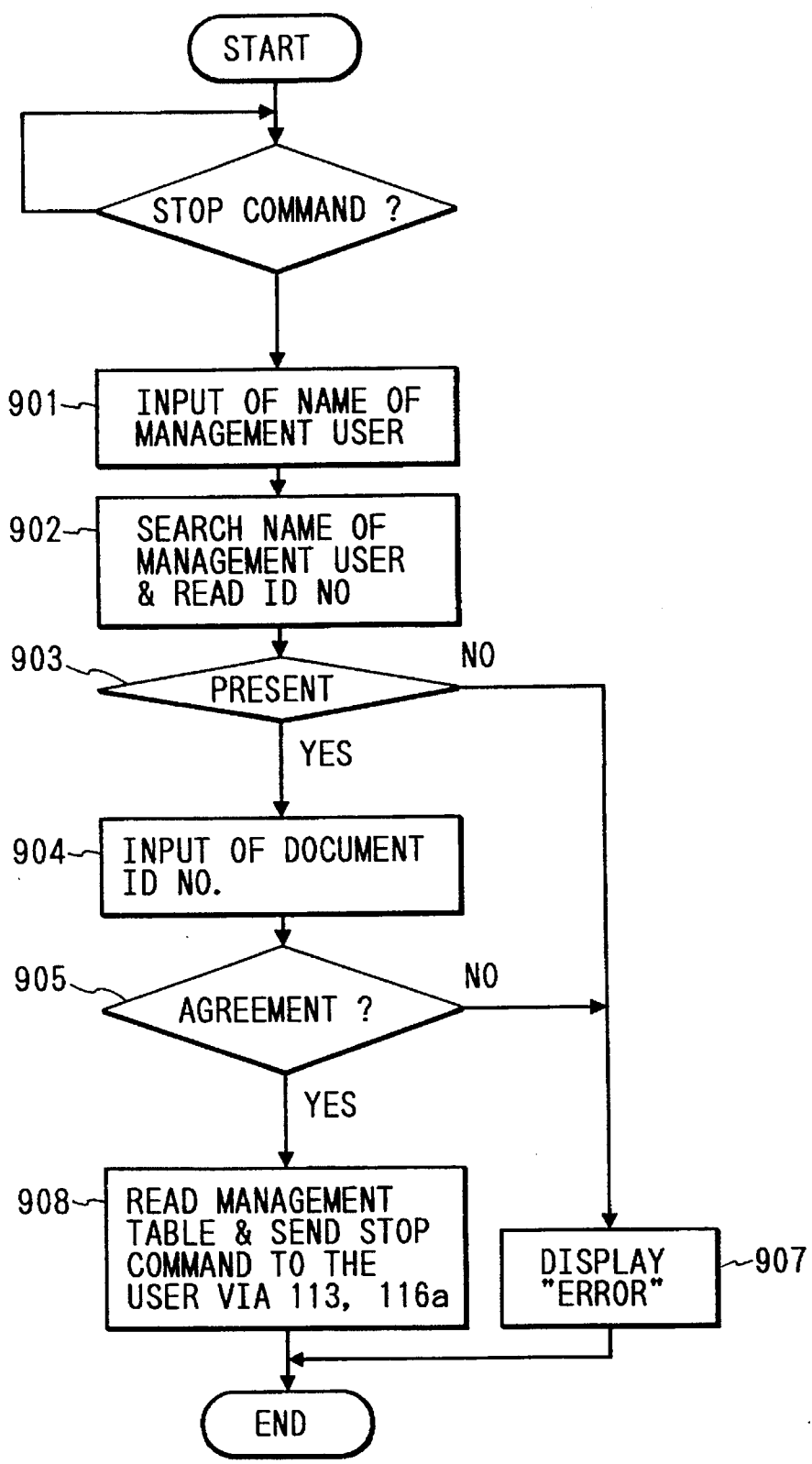
FIG. 13 shows a flow chart of the modification of the second embodiment showing a stop operation of the user control portion shown in FIG. 7.
Figure 14:
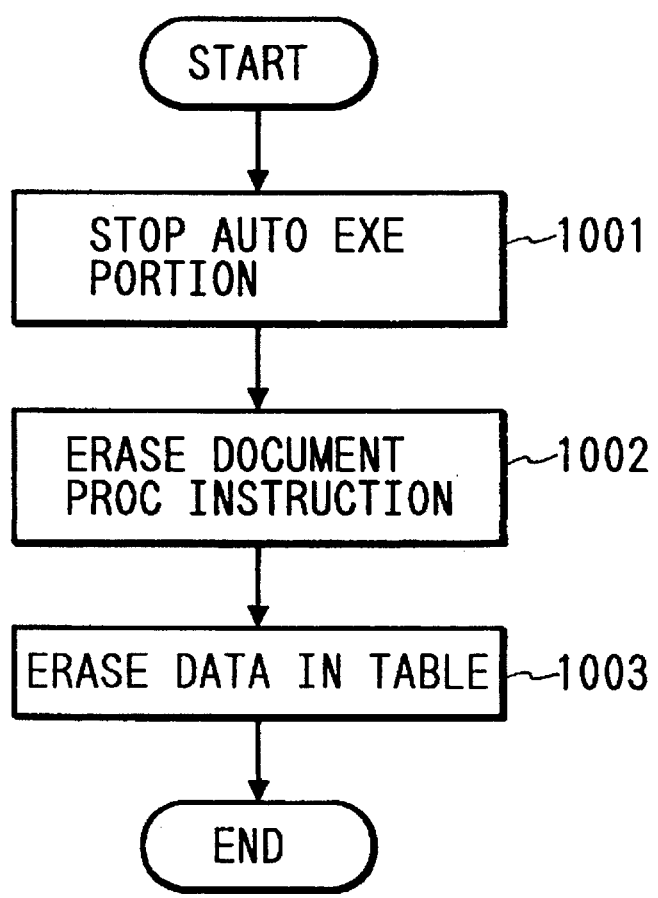
FIG. 14 shows a flow chart of the modification of the second embodiment showing user control portion when the stop command is sent from the arrival of data detection portion shown in FIG. 7.

A modification of the second embodiment will be described. This modification provides a stop operation by the management user after start of distributing of the document. If a management user R desires to stop of distribution and stop of treatment of the document by the other users, the management user enters a stop command toward the user control portion 411' using the keyboard 106 or the mouse 105. FIG. 13 shows a flow chart of the modification of the second embodiment showing a stop operation of the user control portion 411' shown in FIG. 7. When a management user inputs the stop command to the user control portion 411', this processing starts. In the first step 901, a user is required to input the name of the user. The user control portion 411' searches the name of the user as a management user in step 902 and reads the document identification number corresponding to the searched management user. In the following step 903, a decision is made as to whether or not the inputted name is present in the management table. If NO, processing proceeds to step 907. If YES, the user control portion 411 requires inputting of the document identification number in step 904. In the following step 905, a decision is made as to whether or not the inputted document identification number agrees with the searched document identification number. In step 905, if the answer is NO, processing proceeds to step 907. In step 907, the user control portion 111 operates the display to indicate "ERROR" and the processing ends. If the answer is YES in step 905, the user control portion 411' reads the name of user having the document in the management table 417, display it by the display 104, and sends stop command to the searched user through the data transmission portion 113', and the mail box portion 116' in step 908. The mail box portion 116' sends the stop command to the searched user in the data processing apparatus 2a or 2b. An arrival of data detection portion 114' has a function for detecting the stop commend sent and supplies the detected stop command to the user control portion 411'. FIG. 14 shows a flow chart of the modification of the second embodiment showing an operation of the user control portion when the stop command is sent from the arrival of data detection portion 114' shown in FIG. 7. The user control portion 411' stops the auto execution portion 112' if the auto execution portion 112' executes the document processing instruction in step 1001. If the automatic execution portion 112' is not executing the document processing instructions, processing directly proceeds to step 1002. In the following step 1002, the user control portion 411' erases the document processing instruction of the document in question to stop the further execution of the document processing instruction. In the following step 1003, the user control portion 411' erases the data of the document in the management table 417. After processing of step 1003, the processing ends.

As mentioned above, in the second embodiment, the management user can be informed of which user is having or treating the document by provision of the management table 417. Moreover, in the modification of the second embodiment, the management user can stop the distributing the document and document processing instruction at the middle of the distribution route.

In the first and second embodiments, there are various modifications in the data transmission system of the document processing apparatus 1a and 1b. That is, in the above-mentioned examples of the first and second embodiment, though the next user uses the same document processing apparatus, the user control portion 111, the data transmission portion 113, the mail box portion 116, and the arrival of data detection portion 114 transmits the processing instruction data, the document data, the name of user, and the stop commend or the like therebetween. However, this transmission can be omitted because the user data or signals only circulate through these elements. The examples of the data transmission system in the first and second embodiment are provided with an intention to simplify the control programs of the user control portions 111, 411, and 411' because the user control portion can deal the document processing instruction without discrimination of one user using this document processing apparatus 1a from the another user using another document processing apparatus 1b.

If the data transmission in the same document processing apparatus is omitted, data processing speed will increase. In this case, the data transmission to another document processing apparatus 1b, the data transmission portion 113 transmits the processing instruction data, the document data, the name of user, and the stop commend or the like to the mail box portion 116 of the document processing apparatus 1b not through the mail box portion 116 of the document processing apparatus 1a.

What is claimed is:

1. A document processing apparatus comprising:

storing means for storing document data;

instruction generation means for generating a first set of instructions and second sets of instructions with regard to said document data in response to a first user, wherein each of said second sets of instructions is assigned to each of second users;

automatic processing control means for sequentially changing a person who can have access to said document data from one of second users to another of said second users and for controlling of execution of said second sets of instructions for said person; and detection means for detecting a stop command from said first user, wherein said automatic processing control means stops said execution of said second sets of instructions for said person in response to said stop command.

2. A document processing apparatus as claimed in claim 1, wherein said automatic processing control means comprises:

automatic executing means for executing one of said second sets of instructions;

data transmission means for transmitting said first set of instructions, said second sets of instructions, and said document data in said storing means to another of said second users in accordance with said said first set of instructions;

data arrival detection means for detecting an arrival of said transmitted first set of instructions, said second sets of instructions, and said document data from said data transmission means and for informing an operator of said arrival; and execution user control means for detecting whether or not said operator agrees with said another of said second users using said first set of instructions and for operating said automatic executing means to execute said one of said second sets of instructions for said another of said second user.

3. A document processing apparatus as claimed in claim 2, wherein said execution user control means detects an execution condition of said first set of instructions and said second sets of instructions and transmits data of said execution condition using said transmission means and said document processing apparatus, further comprising execution condition supervising means, having storing means, for receiving said data of said execution condition, for storing said data in said storing means, and for informing said data stored in said storing means in response to an operation.

* * * * *